United States Patent
Yoshino

[11] Patent Number: 6,027,770
[45] Date of Patent: Feb. 22, 2000

[54] FUNCTIONAL POLYOLEFINIC FILM

[75] Inventor: Takashi Yoshino, Hachioji, Japan

[73] Assignee: Yoshino Kasei Company Limited, Tokyo, Japan

[21] Appl. No.: 09/061,166

[22] Filed: Apr. 16, 1998

Related U.S. Application Data

[62] Division of application No. 08/886,974, Jul. 2, 1997.

[30] Foreign Application Priority Data

Jul. 18, 1996 [JP] Japan ................................. 8-207724
Dec. 27, 1996 [JP] Japan ................................. 8-358475

[51] Int. Cl.$^7$ ........................................................ B05D 3/00
[52] U.S. Cl. ........................ 427/444; 264/209.1; 427/322; 427/536
[58] Field of Search .................................. 427/536, 322, 427/444; 264/209.1

[56] References Cited

FOREIGN PATENT DOCUMENTS 37 10670 A1  10/1987  Germany.
0 068 433   1/1983   U.S..

OTHER PUBLICATIONS

Database PAJ on EPO, JP 2–232 A (Tokuyama Soda Co. Ltd.) Sep. 14, 1009 (Sep. 14, 1990, abstract).

*Primary Examiner*—Bernard Pianalto
*Attorney, Agent, or Firm*—Gary M. Nath; David R. Murphy; Nath and Associates

[57] ABSTRACT

A functional polyolefinic(tubular) film combined with an inorganic filler (such as $CaCO_3$) having a thickness of 5–150 $\mu$m, which is applied in a corona discharge at a high voltage current of 50–3,000 $W/m^2/min$. A process for manufacturing that film. Products obtained from that film [packaging bag, adhesive-backed sheet and adhesive tape (such as tape for adhesive masking film for coating)].

2 Claims, No Drawings

FUNCTIONAL POLYOLEFINIC FILM

This application is a Divisional of U.S. patent application Ser. No. 08/886,974, filed Jul. 2, 1997.

BACKGROUND OF THE INVENTION

1. Field of the Invention

The present invention relates to a functional polyolefinic film. In more detail, it relates to a polyolefinic film, or a tubular film applied in corona discharge treatment at a high voltage current, which has not been proposed conventionally, and manufacturing method thereof, and bags for packaging, adhesive sheet and adhesive tape manufactured from their films.

2. Description of the Prior Art

In general, paper is opaque and weak against water, and also in mechanical strength but quite low in cost, hygroscopic, superior in touching, air permeability, moisture permeability, adhesive property, writing property and printing property and so on, in addition, easy to be torn by hand and good to recover as base material (hereinafter referred as "recoverability") and to be disposed (hereinafter referred as "disposability"), so that a large amount of paper has been used. On the other hand, polyolefinic film is superior in transparency, mechanical strength and water resistance, comparatively low in cost, and so that a large amount of the film is used also in a various fields, but not soft in touch, inferior in air permeability, moisture permeability and adhesive property and not easy to be torn by hand like in case of paper and inferior in base material recoverability and disposalability. That is, there have not existed such polyolefinic film such as having water resistance and being superior in touch, air permeability, moisture permeability, writing property and printing property. If such film as a polyolefinic film which has such properties of paper is developed, it can be not only for replacement with paper but also for a widely new use, in which a tearing property is needed but paper is not used therefor due to low water resistance.

The object of the present invention is to provide the functional polyolefinic film or tubular film, which have not been proposed conventionally, being superior in touch, air permeability, moisture permeability, printing property, writing property and adhesive property like in paper, and easy to be torn by hand, resistance for water and chemicals, which means not broken with water and not deteriorated by being in contact with such as acid or alkali and good for disposability, and manufacturing method thereof and the products in which such materials are used.

The present inventor has completed the invention relating to the manufacturing technique by applying a corona discharge on the inner surface of the polyolefinic tubular film to make a masking film, filed a patent application thereof and obtained a Japanese Patent under the number of 2,514, 899. On the other hand, when developing this technique of the patent, he has found an outstanding result for solving the above conventional problems in case a specific condition of the corona discharge is applied and continued to study this technique and completed the present invention.

SUMMARY OF THE INVENTION

The present invention relates to a functional polyolefinic tubular film consisting of polyolefinic resin composition combined with inorganic filler which is 5–150 μm in thickness and on either inner or outer surface, or on both surfaces of which a corona discharge is applied at a application power of 50–3,000 W/m$^2$/min.

Further, the present invention relates to a functional polyolefinic tubular film consisting of polyolefinic resin composition combined with inorganic filler, on either inner or outer surface, or on both surfaces of which a corona dicharge is applied, is characterized in that at least one of physical property values of tearing strength, strength at rupture, elongation at rupture and shock strength after the corona discharge is applied is less than 70 as a relative value compared with 100 as the corresponding physical value taken before the corona dicharge treatment. Still further the present invention relates to a functional polyolefinic tubular film consisting of polyolefinic resin composition combined with inorganic filler, on either inner or outer surface, or on both surfaces of which a corona dicharge treatment is applied, is characterized in that one or both of physical property values of an air permeability and a moisture permeability after the corona discharge application is more than 300 as a relative value compared with 100 as the corresponding physical property value taken before applying the corona discharge.

Further more details of the invention will be explained as follows. Provided that the physical property value (initial value) of the tubular film before the corona discharge application is settled as 100, the physical property value after applying the corona discharge, as to tearing strength, strength at rupture, elongation at rupture or shock strength, at least one of them, preferably plural values are less than 70, more preferably less than 60 and most preferably in particular less than 50. The lower limit of these physical property value is not determined in particular, as long as the aimed tubular film is obtained, it may be lower, but usually the lower limit is about 10. Further, in the case of the air permeability and the moisture permeability, provided that at least one of them, preferably both of them, is settled as 100 as initial value, it may be more than 300, more preferably more than 400 and most preferably more than 500. As to the upper limit of the physical properties value after the corona discharge application, as long as the aimed tubular film is obtained, it may be a higher value, but it is usually about 2,000. It is essential to make the physical property value of the tubular film after the corona charge treatment in order to obtain the tub ar film which is the purpose of the present invention.

For reference, the measuring method of each physical property values are as follows.

Tearing strength: JIS K7128, Process B (Elmendorf method)
Strength at rupture: JIS K7127
Elongation at rupture: JIS K7127
Shock strength: ASTM D1709
Air permeability: JIS P 8117
Moisture permeability: JIS Z 0208

In the preferable manner of the functional polyolefinic tubular film of the present invention, a polyolefinic resin composition containing at most 30 parts by weight of styrene-butadiene co-polymer containing 65–85 wt % of styrene is used. In the preferable manner of the functional polyolefinic tubular film of the present invention, a polyethylenic resin containing at most 30 wt % of polypropylenic resin is used as polyolefinic resin.

In another preferable manner of the functional polyolefinic tubular film, it is prepared in a form of roll to intend to make the product compact and improve the usability. When preparing the tubular film in a form of roll, it is carried out by being rolled up on a core in a flat form in the longitudinal direction. As a core material, a tubular body, for example, a paper tube, a plastic tube, a metal tube or a wood tube or the like, or a rounded bar (for example, a bar like solid cylinder) made of the above material. From the cost and functional viewpoint, the paper tube is preferable. Further, if it does not matter from manufacturing or using viewpoint, without using a core to prepare a roll, the above tubular film may be rolled up.

Further, the functional polyolefinic tubular film of the present invention can be made flat and folded to make the film compact and intend to improve the usability.

And, the present invention relates to a manufacturing method of a functional polyolefinic tubular film characterized in applying a corona discharge in application power of 50–3,000 $W/m^2/min.$ on either inner or outer or both surfaces of a polyolefinic tubular film composition combined with an inorganic filler.

In the present invention, the tubular film usually is manufactured by an inflation method, which may be carried out in air cooling or in water cooling.

The thickness of the tubular film obtained by the above inflation method is preferably within the range of 5–150 $\mu$m, preferably in particular it is within the range of 10–80 $\mu$m. This is because, if the thickness is less than 5 $\mu$m, it is too weak-kneed, and happens to become difficult in manufacturing, and if it is more than 150 $\mu$m, the central portion in thickness direction of the film is hardly influenced by a high voltage current and it is hard to obtain a functional film to be attained by the present invention.

In particular, when the thickness of the film is thin like in approximately 10–30 $\mu$m, the functional film is manufactured at a comparatively low treating power and promptly at low cost, which has the superior physical properties, that the present invention intends to obtain, such as the touching, the air permeability, the moisture permeability, the printing property, the writing property and the adhesive property and that the tearing becomes more easy and superior in water resistance and in resistance to chemicals.

In the present invention, the corona discharge on the tubular film is carried out on either inner or outer, or both surfaces within a specific range by applying a high treating power of 50–3,000 $W/m^2/min.$ If the treating power is less than 50 $W/m^2/min.$, the functional film having the specific properties which the present invention intends can not be obtained, if it is more than 3,000 $W/m^2/min.$, the lives of the electrode roll and the treatment roll become short and the film suffers from generating a lot of large holes, a film having even quality can not be obtained. And, the treating power shows the value which is given by dividing an electric capacity(W) indicated with a number of watt by the width (m) of the film to be treated and a film speed (m/min.), which indicates a unit of $W/m^2/min.$ The power applied in the present invention is given by arranging appropriately the power and/or the film speed in accordance with the film width. For instance, compared with the normal corona discharge, if employing the followings such as approximately 2–100 times of power, or approximately 0.01–0.5 times of film speed, the large amount of treating power of the present invention is applied. Further, it needs not to mention that, if it is possible to obtain a wished film, the treatment power may be of 50–3,000 $W/m^2/min.$ by combining the power capacity other than the above with film speed.

The corona discharge application on the inner surface of the tubular film can be carried out by applying the treating power of 50–3,000 $W/m^2/min.$ on the outer surface of the tubular film while contacting at least a pair of electrodes applied by a high voltage current with the outer surface of the film in the state keeping a space of 1–7 mm from the inner surface of the film running in the existence of a sealed gas such as air, nitrogen gas, argon gas, xenon gas or carbon dioxide. In a known corona discharge treatment, although merely 30–40 $W/m^2/min.$ of high voltage current is applied, in the present invention, although the application power is varied in a high or low value according to the thickness of the polyolefinic film, in the case of a similar thickness at least 2 times of the treating power of normal corona discharge is applied, such powerful treating power has never been informed, for the first time it has been experimented and reported by the present inventor. Accordingly, the effect of such powerful application power of the present invention has not completely been expected.

The corona discharge application on the outer surface of the tubular film is carried out by making the inner surface of the tubular film in running state tightly in contact with the inner surface right after being molded in an inflation method, or after being applied with the corona discharge application, and being applied by 50–3,000 $W/m^2/min.$ of the application power on the outer surface keeping a gap of 1–3 mm between at least a pair of electrodes applied by a high voltage current.

In the case, in the present invention, both surfaces of the tubular film are applied with the corona discharge, the treating power for a corona discharge may be same or different, if it is same, in the form of a flat film both surfaces of it show a homogeneous nature, on the contrary, if a different treating power is used, in the form of a flat film, both surfaces of the film can be different in the nature of wetting tension and so on. In the latter case, it is advantageous to differentiate the front and the back when using it in the case where the front and the back is needed to be differentiated. Further, when carrying out the corona discharge treatment, it does not matter which surface of the inner or outer first to be applied.

In the present invention, polyolefinic resin includes a single polymer or a combination of more than one selected from the group of a high-pressure low-density polyethylene, an ethylene-vinyl acetate co-polymer, an ethylene-acrylic ester co-polymer, an ionomer, a high density polyethylene, a medium density polyethylene, a straight-chain low density ethylene-$\alpha$-olefin co-polymer, a very-low density straight-chain ethylene-$\alpha$-olefin co-polymer, a polyolefinic by metallocene catalyst, polypropylene, a polybutene-1, a poly-4-methylpentene-1.

As the inorganic filler to be used in the present invention, calcium carbonate, talc, kaolin, diatomite, calcium sulfite, magnesium carbonate, barium carbonate, magnesium sulfite, barium sulfite, calcium sulfite, aluminum hydroxide, magnesium hydroxide, calcium oxide, magnesium oxide, zinc oxide, titanium oxide, clay, calcium silicate, hydrotalcite, silica, silica gel, alumina, alumina gel, zeolite, cristobalite, tourmaline, shirasu(volcanic ash), shirasu balloon, crinobutilite, Ohya-stone, kaolin, colloidal sulfur, ultramarine, chromium oxide, nickel oxide, wet ferric oxide (which is formed by blowing a gas containing oxygen such as air in a suspension including neutralization reaction precipitates between an aqueous solution of ferrous salt and an alkaline aqueous solution such as aqueous solution of the alkali carbonate while controlling the temperature at 20–70° C. For example, goethite particle ($\alpha$-FeOOH), lepidocrosite particle ($\gamma$-FeOOH) or $\delta$-FeOOH particle are mentioned. Configuration of the particles is like either one of a spindle, a needle or plate), particle of granular magnetite (which is formed by blowing a gas containing oxygen such as air in a suspension including neutralization reaction precipitates between an aqueous solution of ferrous salt and an alkaline aqueous solution such as aqueous solution of alkali hydroxide while controlling the temperature at 45–100° C. For example, hematite ($\alpha$-$Fe_2O_3$) particle, magnetite ($FeO_x \cdot Fe_2O_3$, $0 < x \leq 1$) particle or maghemite ($\gamma$-$Fe_2O_3$) particle are mentioned. Configuration of particles is like either one of a spindle, a needle, a plate, a sphere, an octahedron, a polyhedron or an amorphous and so on) are mentioned, and these can be used in single manner or in any combination manner of more than one.

The inorganic filler to be used in the present invention is preferably treated in surface with any treatment agent in order to prevent it from being condensed, increase the dispersion to polyolefinic resin and increase its workability. As the agent for surface treatment, the followings are mentioned: silane coupling agent (for example, amino silane, me acryloxysilane, glycidoxysilane, mercaptosilane, vinyl silane and so on), aluminum coupling agent (for example, di-isopropoxy-aluminium-ethylacetoacetate, di-isopropoxy-aluminium-monometacrylate, aluminium-stearate-oxidetrimer, isopropoxy-aluminium-alkylacetoacetate-mono-di-octylphosphate and so on), titanate coupling agent (for example, isopropyl triisostearoyl titanate, isopropyl bis(di-octylphosphite) titanate, isopropyldodecylbenzene sulfonyl titanate and so on), aliphatic acid (for example, stearic acid, palmitic acid, myristic acid, lauric acid and oleic acid and so on), aliphatic acid metal salt (for example, sodium stearate, calcium stearate, sodium palmitate, calcium palmitate, sodium milistate, calcium milistate, sodium laurate, calcium laurate, sodium oleate and calcium oleate and so on) and fatty amide (for example, stearamide and oleamide and so on).

The diameter of the particles of the inorganic filler combined in the polyolefinic resin in the present invention is preferably 0.1–20 $\mu$m in average. This is because what is less than 0.1 $\mu$m is liable to be aggregated and difficult to combine to polyolefinic resin, and what is more than 20 $\mu$m in average diameter of the inorganic filler, a forming a film by inflation method becomes difficult and the surface property of the film happens to be deteriorated.

In addition, the amount of volume to be combined of the inorganic filler is appropriately optional in accordance with the tubular film to attain, but normally it is 20–300 parts by weight to 100 parts by weight of polyolefinic resin. This is because, if the combined amount of the inorganic filler is less than 20 parts by weight, the function to be attained by the present invention, for example to obtain a property like a paper is difficult, and if it is more than 300 parts by weight, it is difficult to form the film by inflation, in addition the surface property of the thus obtained film happens to be deteriorated.

The base material of the functional polyolefinic tubular film of the present invention is a resin composition consisting of the above polyolefinic resin and the inorganic filler, but when using a resin composition containing at most 30 parts by weight styrene-butadiene copolymer containing 65–85 wt % of styrene in addition to the above polyolefinic resin and the inorganic filler, a flexibility, an easy tearing property and an elongation at rupture are improved to approach to the paper property.

And, when using a polyethylenic resin as a resin component, if a polyethylenic resin combined with at most 30 wt % of the polypropylenic resin i.e. a composition consisting of 70–100 wt % of polyethylene resin and 30–0 wt % of polypropylene resin is used, the obtained properties such as an easy tearing and a tensile strength are more improved to approach to the paper property.

In the resin composition of the present invention, a biodegradation-imparting agent or a photodegradation-imparting agent may be combined. As the biodegradation-imparting agent, the followings can be mentioned, that is: a monosaccharide such as glucose, galactose, mannose and fructose, a disaccharide such as maltose, lactose and sucrose, a polysaccharide such as starch, dextrin, cellulose, inulin, agarose, fructan, an amino sugar such as chitin, chitosan, amikacin, sisomicin, a reducing sugar such as aldose, ketose and heptose and an sugar alcohol such as tetritol and pentitol. The starch or its derivatives which are easy to be available and low in cost are easy to manufacture the film involving such materials with a higher function, and preferable in the property of biodegradation-imparting agent.

Further, as a starch or its derivatives, for instance, the starch obtained from Indian corn, potato, rice, sweet potato and wheat and so on, or the starch grafted with polymerizable monomer, the starch coated with silicone and so on or starch derivatives, such as modified starch which contains as main ingredients sugars such as glucose, molasses or casein sugar, and which is modified with organic material which is liable to be eaten by any organisms.

In the present invention, the combination amount of the biodegradation-imparting agent to a resin composition is not limited in particular, however it varies greatly depending on the kind of the biodegradation-imparting agent to be used or the use of the film to be used, and usually the biodegradation-imparting agent is combined by the amount of 1–80 wt % preferably 5–70 wt % of 100 wt % of the composition including polyolefinic resin.

In particular, in the case starch or its derivatives are combined as the biodegradation-imparting agent, the combination amount thereof is 5–70 wt % preferably 6–50 wt %, in particular preferably 7–20 wt % of 100 wt % of the composition including polyolefinic resin. If the amount of the starch or its derivatives is more than 5 wt %, according to the increased amount the biodegradation property is increased, and if it is more than 70 wt %, the physical property of polyolefinic resin is decreased outstandingly to cause it as the film to become inappropriate in actual use.

Further, by the combination of the photodegradation-imparting agent i.e. an additive generally calied as a photosensitive reagent, such as a light sensitizer having a carbonyl group (benzophenone, acetophenone, anthroquinone etc.) or metallic compound (such as metallic salts of organic acid), in addition to the biodegradability, the photodegradability is added, so that the decomposition of the film can be promoted after disposal. Further, when containing such photodegradation-imparting agent which may decompose the films when the films are abolished in soil or water, even if there is little microorganisms in the soil or water into which the films are abolished, or the abolished films are come out of the soil or water, the decomposition of the films are promoted rapidly. For that purpose, in the preferable manner of embodiment, the tubular film is manufactured from the resin composition combined with the photodegradation-imparting agent in addition to the biodegradation-imparting agent.

As the concrete example one or a combination of at least two selected from the followings is mentioned: ferrous diethyl-dithiocarbamate, manganese diethyl-di-thiocarbamate, zinc dibutyl-di-thiocarbamate, zinc di-isopropyl-di-thiophosphate, 1,4-benzoquione, benzylidenephthalide, $\beta$-[cyanobenzyliden] phtharide, N-o-phenyl-3-benzylidenephthaloimidine, anthraquinone and its derivatives, benzophenone and its derivatives, benzotriazole and its derivatives, 1,2-dibenzoylethylene, dibenzoylbenzene, ditoluylbenzene, indandione, indanone, coumaranone, aliphatic acid metallic salt (for example:

cobalt acetate, nickel acetate, nickel laurate, copper stearate acid, ferric stearate, zinc stearic acid), iron acetyllactonate, 2-hydroxy-4-octyloxylbenzophenone and so on.

The combined amount of the photodegradation-imparting agent may be different depending on the photodegradability intended, however usually it is combined in such a manner that of 100 wt % of a composition with polyolefinic resin 0.2–10 wt %, preferably 0.5–10 wt % of photodegradation-imparting agent may be included.

And, by adding autooxidation agent, oxidized oil or metallic salts, metallic oxide or metallic hydroxide and so on besides biodegradation-imparting agent and photodegradation-imparting agent, it is further promoted to decompose the films in soil or water. It is a matter of course to carry out a combination of other additives within the range wherein the object of the present invention may not be lost.

As autooxidation agent, substances to promote the oxidative destruction of the polyolefinic resin having carbon-carbon double bond, such as oleic acid or ester thereof and so on, as oxidized oil, oxidized animal oil (such as tallow, lard, milk fat) and oxidized vegetable oil (such as rape-seed oil, corn oil, sunflower oil, safflower oil) and as metallic salts, metallic oxides or metallic hydroxides such as inorganic acid salts (such as sulfite, hydrochloride, carbonate) or organic acid salts (such as carboxylate), oxide, or hydroxides of sodium, potassium, calcium, magnesium, zinc, aluminium, manganese or iron are mentioned.

Further, the resin composition to be manufactured as the tubular film of the present invention may be combined with the biodegradation plastics and/or the photodegradation plastics. As the biodegradation plastics; polycaprolactone, aliphatic acid polyester such as poly (lactic acid), poly (glycol acid) or poly(hydroxybutylate), aliphatic polyestercopolymer, polyurethane resin, polyamide resin, polyvinylalcohol, polyether such as polyethyleneglycol or polypropyleneglycol, as the photodegradation-plastics; ethylene-carbon monoxide copolymer, polyketone such as vinylketone copolymer are mentioned.

The present invention also relates to such functional polyolefinic film as mentioned below.

A film applied with a corona discharge at an treating power of 50–3,000 W/m$^2$/min. on at least one side of the film being made of polyolefinic resin composition combined with an inorganic filler and having 5–150 μm in thickness.

A film applied with a corona discharge on at least one side of the film being made of polyolefinic resin composition combined with an inorganic filler, at least one of the physical properties of a tearing strength, a strength at rupture, an elongation at rupture or a shock strength after the corona discharge application is less than 70 comparing to the corresponding physical property value as 100 of the film just before the corona discharge application.

A film applied with a corona discharge on at least one surface of the film being made of polyolefinic resin composition combined with an inorganic filler, one or both physical property values of an air permeability or a moisture permeability after the corona discharge application is more than 300 as relative value comparing to the corresponding value as 100 of the film just before the corona discharge application. For reference, all of the examples and the preferable manners of the above mentioned substances or processes to the functional polyolefinic tubular film of the present invention can be adapted similarly to the functional polyolefinic film of the present invention. The functional polyolefinic film according to the present invention can be processed by applying the corona discharge on at least one surface of the film consisting of the polyolefinic resin composition combined with an inorganic filler at the power of 50–3,000 W/m$^2$/min.

Concretely, after applying a corona discharge at a given power, the functional polyolefinic film according to the present invention can be manufactured by cutting a tubular film at any portion perpendicular to the longitudinal direction, or by applying a corona discharge at a given power to a plain sheet-like film opened from a tubular film or to an originally formed sheet-like film.

Further, the functional polyolefinic film of the present invention, which forms an approximately square shape, rectangular shape or band-like, can intend to make it compact or increase the way of how to use it by rolling it on a tubular body or bar to form a roll or folding it.

The functional polyolefinic film and the tubular film have a various uses, but above all, the present invention relates to a packaging bag which is formed by cutting the functional polyolefinic tubular film by a given length perpendicular to the longitudinal direction of the tube and heat-sealing one opening. Accordingly, the above heat-sealed portion forms a bottom portion of the bag and the given length at the time of cutting becomes a height of the bag.

The functional polyolefinic film of the present invention can be used preferably as a base material of an adhesive-backed sheet or adhesive tape. Accordingly, the present invention relates to an adhesive-backed sheet which is formed by applying an adhesive on one or both surfaces of the functional polyolefinic film, or an adhesive tape which is formed by applying an adhesive on one or both surfaces of the functional polyolefinic film cut by a given width.

In the adhesive-backed sheet or adhesive tape, the support member may be a type of one-sided adhesive, in which one surface is applied with an adhesive and the opposite surface is applied with a release medium or a type of both-sided adhesive in which both surfaces are applied with an adhesive. In the case of the latter i.e. both-sided adhesive, one of the both sides is layered with a release sheet. And, in the case of former i.e. one side adhesive, a release agent may happen to be omitted.

The adhesive tape according to the present invention can be made use of preferably the object to be coated by applying it as a masking film for coating. In a preferable case where the adhesive tape of the present invention is applied to a masking film for use of coating, the above mentioned adhesive tape of the present invention is adhered on at least one portion of the edge area of the masking film (for instance, polyolefinic film) leaving an un-adhered portion.

Also, the functional polyolefinic tubular film of the present invention can be used as a masking film itself for use of coating.

The functional polyolefinic tubular film and the functional polyolefinic film of the present invention are a completely new type of film which is very similar in paper natures such as air permeability, moisture permeability, susceptibility to water, hygroscopicity, printing property, flexibility, coating ability, writing ability and adhesive property, near to the values of paper nature in connection with the strength such as the tensile strength and the tearing strength, which paper has, easy to break or tear it by hand, in addition superior in the properties of such as water resistance and chemical resistance and preferable in treatment for disposal.

Therefore, it needs not to mention as a replacement of a paper, and it is used as replacements of such as non-woven, woven fabrics and clothes, for instance, for use of packages (bags, boxes, envelopes) for cookies, fruits, vegetables, corns, fishery products, miscellaneous goods, clothing, books, toys, tools, CDs, CD-ROMs, floppy discs, stationery, mechanical parts and electronic parts, also for use of protective sheet (film), or for use of provisional adhering sheet (film) and for use of base material for adhesive-backed sheet and adhesive tape.

In addition, since the above film of the present invention is superior in printing property and writing property, it can be used for a replacement of normal paper, in particular of a synthetic paper.

Further, since the present invention has air permeability, moisture permeability and light intercepting property, it can be used as packaging paper, paper for Shoji, house film for agriculture, mulching film for agriculture, light intercepting bag for fruits, protecting film or masking film and so on.

Other than the above, since the film of the present invention has the above superior properties, it can be used as sheets for construction (for instance, such as moisture preventing sheet) or wall papers. In particular, adhesive-backed sheet (film) and adhesive tape are what the nature of the functional polyolefinic film of the present invention is maximally utilized.

Since the adhesive-backed sheet and a sive tape are adhered on the plates of such as glass, metals, stones, plastics, woods and protects them, it is preferably used for adhering things such as baggages, corrugated boards, boxes, papers, plastics, fabrics, woods, metals and ceramics. In particular, the adhesive-backed sheet is used as dust-taking off roll and the adhesive tape is used as tape for adhering masking film, for adhering paper diaper, kraft tape or gum tape for packaging. The masking film for coating which is adhered by the adhesive tape of the present invention is used for instance for coating automobiles, buildings, roads, exercise field (stadium), parking areas and vehicles.

EMBODIMENT

Next, although the present invention is explained in detail based on the embodiment illustrated, it is not limited to this explanation.

Manufacturing Example No. 1 of tubular film 100 parts by weight of linear chain ethylene-butene-1 copolymer prepared in a low pressure vapor phase method at 0.920 g/ml density, 1.0 g/10 min. melt index, and 70 parts by weight of calcium carbonate (the surface is treated by sodium stearate) having particle dia. in 2 μm in average are heated and kneaded at 180° C. for 20 minutes in a Banbury mixer to obtain a resin composition. It is excluded from a circular die at 180° C. and obtained a tubular film by an air cooled inflation method having the thickness of 10 μm and 30 cm of flat width.

Keeping the inside gap of the tubular film in 1.8 mm, while sealing air inside, and keeping the running speed of the film at 15 m/min., using a corona discharge instrument (made by Kasuga Denki), it is applied at 30 kHz frequency and the application power of 85 W/m$^2$/min.

Then, it is made running at the speed of 15 m/min. while keeping contact the inner surfaces of the tubular film tightly, and then while keeping the gap between an electrode and the film in 1.8 mm, and using a film outer surface corona discharge application instrument (made by Kasuga Denki), it is applied at 30 kHz frequency and the application power of 85 W/m$^2$/min.

Thus processed films are measured of each physical property value and the results are compared with each of the initial value.

Tearing strength: JIS K7128, Process B (Elmendorf method)
Strength at rupture: JIS K7127
Elongation at rupture: JIS K7127
Shock strength: ASTM D1709
Air permeability: JIS P 8117
Moisture permeability: JIS Z 0208

The obtained film was 60% of the initial value of the tearing strength (vertical direction: 7.2 g), 54% of the initial value of the strength at rupture (vertical direction: 0.41 kg/25 mm), 83% of the initial value of the elongation at rupture (vertical direction: 365%), 26% of the initial value of the shock strength (28 g/26 inches height), 5 times of the initial value of the air permeability (26 sec/100 cc), 8 times of the initial value of the moisture permeability (16,000 g/m$^2$ for 24 hrs), and easily torn by hands, sufficient for permeability in air and moisture, so that the nature of the film was to be said similar to paper.

Comparative example in manufacturing the tubular film

In the manufacturing example 1, the corona discharge treatment was carried out on both inner and outer surfaces, at the application power of 20 W/m$^2$/min., which is to be carried out for improving a normal surface wetting tension, the values of the tearing strength, strength at rupture, elongation at rupture, shock strength, air permeability and moisture permeability were all appropriately same with the initial value respectively and the functional polyolefinic film similar to the nature of paper was not obtained.

Manufacturing example 2 of the tubular film 100 parts by weight of high density polyethylene at 0.950 g/ml density, 2.0 g/10 min. melt index, 20 parts by weight of magnetite (FeO$_{0.5}$·Fe$_2$O$_3$) having particle dia. in 0.3 μm in average and 20 parts by weight of barium sulfate (the surface is treated with sodium stearate) having particle dia. in 15 μm in average are heated and kneaded at 180° C. for 20 minutes in a Banbury mixer to obtain a resin composition. It is excluded from a circular die at 180° C. and obtained a tubular film having the thickness of 20 μm and 50 cm of flat width at 3.5 blow ratio and a winding speed of 80 m/min. by an air cooled inflation method. Keeping the inside gap of the tubular film in 2.5 mm, while sealing air inside, and keeping the running speed of the film at 30 m/min., using a corona discharge instrument (made by Kasuga Denki), it is applied at 20 kHz frequency and the treating power of 300 W/m$^2$/min. Then, it is made run at the speed of 30 m/min., while keeping contact the inner surface of the tubular film tightly, and then while keeping the gap between an electrode and the film in 2.5 mm, and using a film outer surface corona discharge application instrument (made by Kasuga Denki), it is applied at 20 kHz frequency and the application power of 300 W/m$^2$/min.

The obtained film was 72% of the initial value of the tearing strength (vertical direction: 18.5 g), 63% of the initial value of the strength at rupture (vertical direction: 0.87 kg/25 mm), 73% of the initial value of the elongation at rupture (vertical direction: 387%), 41% of the initial value of the shock strength (36 g/26 inches height), 3.6 times of the initial value of the air permeability (58 sec/100 cc), 5.4 times of the initial value of the moisture permeability (10,800 g/m$^2$ for 24 hrs), and easily torn by hands, sufficient for permeability in air and moisture, so that the nature of the film was to be said similar to paper.

Manufacturing example 3 of the tubular film 100 parts by weight of ethylene-vinyl acetate copolymer containing 18 wt % of vinyl acetate at 0.935 g/ml density, 3.2 g/10 min. melt index, 20 parts by weight of starch particle of indian corn and 30 parts by weight of zeolite having particle dia. in 5 μm in average are heated and kneaded at 180° C. for 20 minutes in a Banbury mixer to obtain a resin composition. It is excluded from a circular die at 170° C. and obtained a tubular film having the thickness of 80 μm and 80 cm of flat width at 3.2 blow ratio and a winding speed of 50 m/min. by an air cooled inflation method. Keeping the inside gap of the tubular film in 2.5 mm, while sealing air inside, and keeping the running speed of the film at 20 m/min., using a corona discharge application instrument (made by Kasuga Denki), it is applied at 15 kHz frequency and the application power of 1,200 W/m²/min. Then, it is made run at the speed of 20 m/min. while keeping contact the inner surfaces of the tubular film each other tightly, and then while keeping the gap between an electrode and the film in 2.5 mm, and using a film corona discharge application instrument (made by Kasuga Denki), it is applied at 15 kHz frequency and the application power of 1,200 W/m²/min.

The obtained film was 47% of the initial value of the tearing strength (vertical direction: 38.1 g), 58% of the initial value of the strength at ruptured vertical direction: 1.26 kg/25 mm), 67% of the initial value of the elongation at rupture (vertical direction: 425%), 55% of the initial value of the shock strength (47 g/26 inches height), 7.2 times of the initial value of the air permeability (287 sec/100 cc), 6.7 times of the initial value of the moisture permeability (8,900 g/m² for 24 hrs), and easily torn by hands, sufficient for permeability in air and moisture and sufficient flexibility, so that the nature of the film was to be said similar to paper. Further, after this film was buried in soil for three months, strength at rupture lowered by 15.7% of the above initial value to show a sufficient biodegradability.

Manufacturing example 4 of the tubular film 100 parts by weight of ethylene-ethyl acrylate copolymer containing 12 wt % of ethyl acrylate at 0.940 g/ml density, 2.8 g/10 min. melt index, 30 parts by weight of polycaprolactone and 245 parts by weight of cristobalite particle having particle dia. in 10 μm in average are heated and kneaded at 180° C. for 20 minutes in a Banbury mixer to obtain a resin composition. It is excluded from a circular die at 165° C. and obtained a tubular film having the thickness of 130 μm and 100 cm of flat width at 2.7 blow ratio and a winding speed of 40 m/min. by an air cooled inflation method.

Keeping the inside gap of the tubular film in 6.0 mm, while sealing air inside as a sealed gas, and keeping the running speed of the film at 10 m/min., using a corona discharge application instrument (made by Kasuga Denki), it is applied at 8 kHz frequency and the application power of 2,800 W/m²/min. Then, it is made run at the speed of 10 m/min. while keeping contacting the inner surfaces of the tubular film each other tightly, and then while keeping the gap between an electrode and the film in 3.0 mm, and using a film corona discharge application instrument (made by Kasuga Denki), it is applied at 8 kHz frequency and the application power of 2,800 W/m²/min.

The obtained film was 48% of the initial value of the tearing strength (vertical direction: 87 g), 56% of the initial value of the strength at rupture (vertical direction: 1.89 kg/25 mm), 73% of the initial value of the elongation at rupture (vertical direction: 215%), 47% of the initial value of the shock strength (63 g/26 inches height), 6.1 times of the initial value of the air permeability (6,350 sec/100 cc), 4.3 times of the initial value of the moisture permeability (1,230 g/m² for 24 hrs), and easily torn by hands, sufficient for permeability in air and moisture and sufficient flexibility, so that the nature of the film was to be said similar to paper.

Further, after this film was buried in soil for three months, strength at rupture was lowered by 7.2% of the above initial value (vertical direction: 1.89 kg/25 mm) to show sufficient biodegradability.

Manufacturing example 5 of the tubular film

In the manufacturing example 2, the same processes as well as the manufacturing example 2 are followed other than the further combination of 15 parts by weight of styrene-butadiene co-polymer containing 70 wt % of styrene and 30 wt % of butadiene (melt index 0.9 g/10 min., trade name K-resin made by Philips). The obtained film was 53% of the initial value of the tearing strength (vertical direction: 13.8 g), 41% of the initial value of the strength at rupture (vertical direction: 0.65 kg/25 mm), 65% of the initial value of the elongation at rupture (vertical direction: 395%), 36% of the initial value of the shock strength (28 g/26 inches height), 5.4 times of the initial value of the air permeability (68 sec/100 cc), 7.6 times of the initial value of the moisture permeability (9,800 g/m² for 24 hrs), and easily torn by hands, sufficient for permeability in air and moisture with increased flexibility, so that the nature of the film was to be said similar to paper.

Manufacturing example 6 of the tubular film 100 parts by weight of a resin composition consisting of 85 wt % of high density polyethylene at 0.950 g/ml density, 2.0 g/10 min. melt index and 15 parts by weight of polyplopylene at 0.90 g/ml density, 9 g/10 min. melt flow rate (230° C. ) and 70 pats by weight of calcium carbonate having particle dia. 2 μm in average are heated and kneaded at 180° C. for 20 minutes in a Banbury mixer to obtain a resin composition. It is excluded from a circular die at 180° C. and obtained a tubular film having the thickness of 10 μm and 30 cm of flat width at 3.5 blow ratio and a winding speed of 80 m/min. by an air cooled inflation method.

Keeping the inside gap of the tubular film in 1.8 mm, while sealing air inside as a sealed gas, and keeping the running speed of the film at 15 m/min., using a film inner surface corona discharge application instrument (made by Kasuga Denki), it is applied at 30 kHz frequency and the application power of 85 W/m²/min.

Then, it is made run at the speed of 15 m/min. while keeping contact the inner surfaces of the tubular film each other tightly, and then while keeping the gap between an electrode and the film in 1.8 mm, and using a film cuter surface corona discharge application instrument (made by Kasuga Denki), it is applied 30 kHz frequency and the application power of 85 W/m²/min.

The obtained film was 35% of the initial value of the tearing strength (vertical direction: 3.7 g), 41% of the initial value of the strength at rupture (vertical direction: 0.26 kg/25 mm), 52% of the initial value of the elongation at rupture (vertical direction: 341%), 14% of the initial value of the shock strength (17 g/26 inches height), 8 times of the initial value of the air permeability (18 sec/100 cc), 13 times of the initial value of the moisture permeability (28,000 g/m² for 24 hrs), and easily torn by hands, sufficient for permeability in air and moisture, so that the nature of the film was to be said similar to paper.

Manufacturing example 7 of the tubular film

In the manufacturing example 1 of the tubular film, the order of the corona discharge to the inner or outer surface is reversed, that is, after application on the outer, the inner surface treatment was carried out, the other processes were carried out as well as in the example 1, then the functional polyolefinic film having approximately same physical properties similar to the example 1 were obtained.

Manufacturing Example 8 of tubular film 100 parts by weight of linear chain ethylene-butene-1 copolymer prepared in a low pressure vapor phase method at 0.920 g/ml density, 1.0 g/10 min. melt index, and 70 parts by weight of calcium carbonate (the surface is treated by sodium stearate) having particle dia. in 2 μm in average are heated and kneaded at 180° C. for 20 minutes in a Banbury mixer to obtain a resin composition. It is excluded from a circular die at 180° C. and obtained a tubular film having the thickness of 10 μm and 30 cm in flat width at 3.0 blow rate and a winding speed of 60 m/min. by an air cooled inflation method.

Keeping the inside gap of the tubular film in 1.8 mm, while sealing air inside as a sealed gas, and keeping the running speed of the film at 15 m/min., using a film inner surface coroa discharge application instrument (made by Kasuga Denki), it is applied at 30 kHz frequency and the application power of 150 W/m²/min.

The obtained film was 66% of the initial value of the tearing strength (vertical direction: 7.2 g), 59% of the initial value of the strength at rupture (vertical direction: 0.41 kg/25 mm), 89% of the initial value of the elongation at rupture (vertical direction: 365%), 30% of the initial value of the shock strength (28 g/26 inches height), 4.5 times of the initial value of the air permeability (26 sec/100 cc), 7.2 times of the initial value of the moisture permeability (16,000 g/m² for 24 hrs), and easily torn by hands, sufficient for permeability in air and moisture, so that the nature of the film was to be said similar to paper. Since this film is treated by corona discharge merely on the inner surface, by developing that film, a sheet-like film, merely one side surface of which is applied by a corona discharge is obtained. That sheet-like film can be easily differentiated in front and back, and by applying an adhesive layer on the surface applied by a corona discharge, without applying a release agent on the other surface an adhesive-backed sheet or adhesive tape is obtained.

Packaging bag manufacturing example

By cutting the tubular film obtained in the manufacturing example 4 in a length of 50 cm each and the bottom portion was sealed by heat to obtain a packaging bag. In this bag 20 kg of brocoli was packed and the opening was sealed by heat, and observed it for 4 days at 15° C. and was found that the freshness of the content was kept. Accordingly, it was found that this packaging bag is effective as freshness keeping film.

Manufacturing example of functional polyolefinic film

By flatting the tubular film obtained from the manufacturing example 1 and cutting it at both edges in the longitudinal direction with a razor to obtain two sheets of long films, and each of sheets is wound around a paper cylinder to obtain a roll. A plain film having a length of 100 cm and a width of 30 cm was obtained from the roll. When using this film as a mulching film, it is recognized that growth of the needs are delayed.

Example of manufacture of adhesive-backed sheet

By cutting the tubular film obtained by the manufacturing example 2 in longitudinal direction in parallel at one side with a razor and developing the same to obtain a flat sheet. Then, by cutting it perpendicularly to the longitudinal direction in the length of 300 cm to obtain a sheet film having a rectangular shape of 100 cm×300 cm. On one surface thereof an adhesive was applied with an acrylic adhesive and on the other surface a silicone release agent is applied to obtain an adhesive-backed sheet.

This adhesive-backed sheet was adhered on both sides of a glass of 3 cm thickness to protect the glass. This glass plate was not hurt on the surface during displacement in a warehouse or transportation with vehicles. Used sheets were burnt in the combustion furnace to find that those were completely burnt out under the condition of low temperature and oxygen concentration.

For reference, the adhesive-backed sheets are prepared intending these sheet to be overlapped in plurality for stock before use, so that one side thereof is applied by a release agent, however if it is stocked individually until its use, there is no need of applying a release agent.

Example for manufacturing adhesive tape

The tubular film obtained by the manufacturing example 5 was cut in the longitudinal direction in parallel at both sides with razor to obtain two sheets of plain film having width of 50 cm. On the surface of these films a release agent containing long chain alkyl pendant type polymer as main ingredient was applied, on the back surface an adhesive containing polystyrene-polyisoprene-polystyrene-block copolymer and petroleum resin as a main ingredient was applied and thus obtained sheets were wound on a paper cylinder, which was cut off at every 3 cm width to obtain a plurality of adhesive tapes.

This adhesive tape is easy to cut by hands and very convenient when using. This adhesive tape was applied as fixing a floor seal sheet on a floor. In this case, since the tape is easy to be cut by hands, working efficiency was outstandingly improved. In addition, since the surface of the base material for the adhesive tape is applied powerfully by corona discharge , a free energy on the surface of the base material is very large as 60–70 erg/cm², plural convexes and concaves are generated on the surface of the base material and the bonding strength between the base material and the release agent or the adhesive agent is great, so that the release agent or the adhesive agent is kept stable without peeling off from the surface of the base material. And, when peeling off the adhesive tape from the objects, there remains no adhesive thereon.

Example for manufacturing masking film

The corona discharge treatment was applied on the back surface of a high density polyethylene film having 10 μm in thickness, 100 cm in width and 50 cm in length, and the wetting tension was arranged as 45 dyn/cm. And, to one end in the longitudinal direction, an adhesive tape manufactured in the above mentioned manufacturing example was applied becomes opposite (overlapped) to the corona discharge applied surface of the film to obtain a masking film for coating.

This masking film was applied to an iron plate standing vertically in such a manner as the portion of the adhesive tape was located above and the tape itself was positioned laterally 30 cm in length, and the remaining tape was cut off. When a red acrylic coating material was applied on that film, the coating material was applied evenly on the film without any trouble, and there was no dropping of the coating material. The masking film and the adhesive tape were bonded rigidly and the adhesive layer of the adhesive tape also was also rigidly bonded to the supporting member without peeling off.

Use examples as film with the air and moisture permeability

The air permeability and the moisture permeability of the film prepared in the manufacturing example 4 are measured.

Air permeability: 1,040 sec/100 cc

Moisture permeability: 5,289 g/m²·24 hrs

Thus, in the present invention, although the film is not elongated, it has an air permeability and a moisture permeability equal to a normal elongated film for use of baby's nappy holder, and has become obvious that the touch is better than the conventional film for use of baby's nappy holder. Further, from this film, a simple rain coat is manufactured and tried it on actually, there was no becoming stuffy and kept in shape and strength even in wetting without becoming softened. Further, in use of an air permeable bag for accommodating a heating agent for a throwaway body warmer, there was ample air permeability and heat transmissibility.

Effect of the Invention

Now, the effects derived from the present invention are described hereinafter.

As mentioned above, the functional polyolefinic tubular film and the functional polyolefinic film of the present invention are what are obtained after being applied by the strong corona discharge, which was at least two times compared with the conventional one and has never been carried out for such a film, so that the following effects, which have never been realized hitherto, are derived.

(a) Since the tearing strength and the tensile strength are lowered, which is easy to tear by hand, so that the products prepared from this film are easy to be torn without using such as cutters, accordingly working efficiency is superior. In particular, in the case of the tape, it is superior in being torn laterally.

(b) The outer look and the touch are paper-like, it is used not only as a replacement of paper but also as the replacements of non-woven fabrics, fabrics and cloth.

(c) Since the degree of the air and moisture permeability is large, the usages for what are requested to be air permeable or moisture permeable, for such as baby's nappy holder, packaging bags for keeping freshness and simple rain coat are widely arranged.

(d) In addition to the paper-like touch and easy tearing strength, air and moisture permeability, the properties, which are inferior as paper, such as water resistance and resistance against chemicals are superior, so that it functions as supplementally to defects of paper. And, for use of what are not used because of the inferiority of the water resistance and resistance against chemicals, such as throwaway gloves and various kind of labels for chemicals, it can be used.

(e) Comparing to a normal polyolefinic film, since it is outstandingly improved in disposal of waste, after use, the environmental contamination does not occur, and that the biodegradability or photodegradability is easily given, which causes to exist tender to the environment.

(f) By selecting the kinds of the ingredient which are combined, their ratios or the tension of the corona discharge application, the control for the transparency, the degree of whiteness, mechanical strength or combustibility is easily carried out.

(g) Since many fine convexes or concaves are formed on the surface of the film, the touch is quite similar to paper.

(h) Since the free energy on the surface of the film is quite large, it is greatly of affinity with water, coating material, ink and chemical, so that it is quite similar to the nature of paper, which can supplement the defects of the conventional polyolefinic film with respect to printing property and writing property.

(i) Since the surface of the film is activated and provided with a lot of fine convexes and concaves, the bonding strength with the adhesive or the release agent is quite large, if used as support member of adhesive-backed sheet or adhesive tape, there is no peeling off of the release agent at the time of using, and the bonding strength to the object to be adhered is superior, in addition there is no adhesive left after peeling off.

(j) As the raw material, it uses the polyolefinic resin and the inorganic filler, it can be manufactured at the cost lower than paper.

Further, according to the manufacturing method of the functional polyolefinic tubular film or the functional polyolefinic film of the present invention, the tubular film or the film having the above superior properties are manufactured easily by making use of the conventionally existing apparatus at low cost. In addition, the products including such as packaging bag or other products derived from the tubular film of the present invention also providing the such superior properties as paper has, i.e. superior touch like paper, air permeability, moisture permeability, writing property, printing property, adhesive property, easy tearing property, the superior water resistance and the resistance against chemicals, in addition, appropriate waste treating property, so that these films can be used in a variety of fields such as, for instance, packaging bags, films for agriculture, films for construction (for instance: moisture preventing sheets and so on), adhesive-backed sheet, adhesive tape, provisional protecting film, masking film for coating, incombustible sheet, table cloth, floor cloth, envelope, bag for medicine, shopping bag, paper for poster, paper for calender, stationery, wall material, sheets, cloth, hats, sports goods, instruments for amusement and tape.

What is claimed is:

1. A process for manufacturing a functional polyolefinic film comprising:

(i) molding a tubular film from a composition consisting of 100 parts by weight of a polyolefinic resin and 20–300 parts by weight of an inorganic filler having an average 0.1–20 μm diameter of particles;

(ii) treating an outer surface of the tubular film with a corona discharge at an application power of within 50–3000 W/m$^2$/minute, and at a separate time, treating an inner surface of the tubular film with a corona discharge at a higher application power, thereby making at least one physical property value of the film selected from the group consisting of tearing strength, strength of rupture, elongation at rupture and shock strength has a relative value of less than 70 after the corona discharge application compared with 100 as the corresponding physical property value before corona discharge application.

2. A process for manufacturing a functional polyolefinic film according to claim 1, wherein at least one of physical property value of said polyolefinic film selected from the group consisting of air permeability and moisture permeability, after corona discharge application has a relative value of more than 300 compared with 100 as the corresponding physical property value taken before corona discharge application.

* * * * *